UNITED STATES PATENT OFFICE.

ALFRED E. JURY, OF NEW YORK, N. Y., ASSIGNOR TO NATIONAL INDIA RUBBER COMPANY, A CORPORATION OF RHODE ISLAND.

ADHESIVE MATERIAL.

1,292,333.     Specification of Letters Patent.     Patented Jan. 21, 1919.

No Drawing.     Application filed September 8, 1916. Serial No. 118,979.

*To all whom it may concern:*

Be it known that I, ALFRED E. JURY, a citizen of the United States, residing at New York, county of New York, and State of New York, have invented certain new and useful Improvements in Adhesive Materials, of which the following is a full, clear, and exact description.

This invention relates to adhesive materials and more particularly to an adhesive for joining together pieces of flexible material, adapted to preserve the flexibility thereof.

In making a bond between flexible materials while preserving the flexibility thereof rubber cement has been heretofore used. For example, in the manufacture of tennis shoes and the like a lining of thin material is usually attached to duck or similar fabric by such cement. Rubber cement, however, possesses certain disadvantages—for example, it is expensive and does not permit transpiration therethrough—and it is accordingly the object of the present invention to provide a generally desirable adhesive, which shall overcome these and other disadvantages, while preserving the advantages inherent in such cement.

Specifically the objects of the invention are:—to provide an adhesive which shall be inexpensive and easy to manufacture; which shall make a transpirational bond between materials; which shall indefinitely maintain its flexibility and thus not only permit ready conformation of the material to various surfaces, for example last surfaces, but also provide a permanent flexible bond between materials; and which may be applied to very thin fabrics without danger of its soaking through to the outer surface thereof.

The composition in its preferred form consists of the following ingredients in about the proportions stated:—

| | |
|---|---|
| Dextrin | 40%– 50% |
| Glucose | 5%– 10% |
| Water | 53%– 35% |
| Castor oil | 2%– 5% |
| Totals | 100%–100% |

In making the mixture the dextrin and glucose are dissolved in water, the mixture being heated to approximately 180° F. and after the solution is complete allowed to cool. As the mixture cools it becomes more viscous and after about twenty-four hours reaches its maximum viscosity, at which point the castor oil may be most satisfactorily added. The castor oil is stirred into the mass and is retained therein in a state of emulsion. In this connection I have observed that under the conditions noted dextrin has a remarkable property for maintaining castor and other oils in emulsified form without separation, for a considerable length of time. An antiseptic material may be added at any time during the process of manufacture. I preferably employ for this purpose 1% of sodium bi-sulfite which has a bleaching as well as an antiseptic action.

It has been found that the adhesive material, made in accordance with the composition mentioned possesses in general the characteristics set forth as the objects above. It forms a firm bond between pieces of material and even when applied to relatively thin fabrics does not soak through and cause discoloration of the outer surface thereof. When used in the manufacture of shoes for example it permits ready conformation of the material to the last. Its flexibility and hence applicability to the last remains substantially permanently unchanged. It provides a bond having exceptional transpirational properties and in fact has been found to be more transpirational than leather. The material is not hydroscopic and hence in its application to articles composed partly of rubber the prevention of adhesion between the rubber and the adhesive is avoided. Furthermore, it has been observed that if the material is subjected to the action of moisture that such moisture does not cause the disintegration of the adhesive and consequently the adhesion between the layers remains unimpaired. This action is probably due to the moisture repellent effect of castor oil.

Having thus described my invention what I claim and desire to protect by Letters Patent is:

1. An adhesive composition for uniting fabric surfaces consisting of a dextrin, water and castor oil held in emulsified condition therein.

2. An adhesive composition for uniting fabric surfaces comprising dextrin, water and castor oil.

Signed at New York, county of New York, and State of New York, this 1st day of September 1916.

ALFRED E. JURY.